US009343837B2

(12) United States Patent
Moon

(10) Patent No.: US 9,343,837 B2
(45) Date of Patent: May 17, 2016

(54) DOCKING APPARATUS OF ELECTRONIC APPARATUS

(71) Applicant: Samsung Electronics Co., Ltd., Gyeonggi-do (KR)

(72) Inventor: Heecheul Moon, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 151 days.

(21) Appl. No.: 14/200,501

(22) Filed: Mar. 7, 2014

(65) Prior Publication Data

US 2014/0268542 A1    Sep. 18, 2014

(30) Foreign Application Priority Data

Mar. 13, 2013  (KR) .................. 10-2013-0026972

(51) Int. Cl.
*H05K 5/00* (2006.01)
*H01R 13/44* (2006.01)
*G06F 1/16* (2006.01)
*H02J 7/00* (2006.01)

(52) U.S. Cl.
CPC .............. *H01R 13/44* (2013.01); *G06F 1/1632* (2013.01); *H02J 7/0044* (2013.01)

(58) Field of Classification Search
CPC ................ G06F 1/1632; G06F 2200/1614
See application file for complete search history.

(56) References Cited

U.S. PATENT DOCUMENTS

| 8,848,361 | B2* | 9/2014 | Holzer ................ | G06F 1/1632 361/679.23 |
|---|---|---|---|---|
| 2005/0244025 | A1 | 11/2005 | Schul et al. | |
| 2006/0274910 | A1 | 12/2006 | Schul et al. | |
| 2010/0232117 | A1 | 9/2010 | Yoon | |
| 2011/0043984 | A1 | 2/2011 | Byrne | |
| 2011/0170256 | A1* | 7/2011 | Lee ..................... | G04G 17/086 361/679.44 |
| 2012/0188689 | A1* | 7/2012 | Leung .................. | G06F 1/1632 361/679.01 |
| 2012/0275092 | A1 | 11/2012 | Zhou | |
| 2012/0307422 | A1 | 12/2012 | Wang | |
| 2013/0039521 | A1* | 2/2013 | Zhou .................... | G06F 1/1626 381/333 |
| 2013/0049682 | A1 | 2/2013 | Niec et al. | |

OTHER PUBLICATIONS

Frakes; "Review: Altec Lansing inMotion iM600"; Apr. 12, 2007; XP002729682.

* cited by examiner

*Primary Examiner* — Robert J Hoffberg
*Assistant Examiner* — Hung Dang
(74) *Attorney, Agent, or Firm* — Cha & Reiter, LLC.

(57) ABSTRACT

A docking apparatus of an electronic apparatus that can support the electronic apparatus is provided. The docking apparatus of an electronic apparatus may include a body that forms an exterior of the docking apparatus, a support portion rotatably coupled to the body, and an interface module coupled to the body and including an interface terminal configured to connect the docking apparatus to the electronic apparatus.

23 Claims, 16 Drawing Sheets

DOCKING APPARATUS OF ELECTRONIC APPARATUS

CLAIM OF PRIORITY

This application claims the benefit under 35 U.S.C. §119(a) of a Korean patent application filed on Mar. 13, 2013 in the Korean Intellectual Property Office and assigned Serial No. 10-2013-0026972, the entire disclosure of which is hereby incorporated by reference.

BACKGROUND

1. Technical Field

The present disclosure relates to a docking apparatus, and more particularly, to a docking apparatus of an electronic apparatus that can support the electronic apparatus.

2. Description of the Related Art

Recent electronic apparatuses such as a mobile communication terminal, smart phone, Personal Digital Assistant (PDA), tablet Personal Computer (PC), hand-held PC, and Portable Multimedia Player (PMP) provide various functions such as a communication function, music reproduction function, photographing function, and Internet connection function. For this, the electronic apparatus may include various components such as, for example, a sound output module, a camera module, and a battery.

As consumers are demanding devices that are more portable, the demand for electronic apparatuses having a form factor that has a small thickness has also been increasing. Further, because the electronic apparatus should have a volume and a weight suitable for carrying, there is a limited mounted space for components. Accordingly, the functionality of the electronic apparatus is limited by the shortage of component mounting space. Furthermore, in an electronic apparatus having a small thickness, it is difficult to secure resonance space of a sound output module (e.g., a speaker), and thus a limitation exists in the audio performance of the sound output module.

Therefore, in order to more effectively use a portable electronic apparatus, and to compensate for its limitations, interest has increased in a docking apparatus that can provide various functions through a connection to the electronic apparatus.

In general, the docking apparatus requires an interface terminal for a connection to an electronic apparatus. However, in the docking apparatus, an interface terminal is permanently exposed to the outside. This external interface terminal limits the design possibilities and the aesthetic appearance of the docking apparatus. Further, with respect to a docking apparatus having an external interface terminal, there is a significant probability that a foreign substance may enter into the interface terminal and that the interface terminal may be damaged.

SUMMARY

The present disclosure addresses some of the above problems. In one aspect of the present disclosure, a docking apparatus of an electronic apparatus is provided that can minimize external exposure of an interface terminal for connection to the electronic apparatus.

In another aspect of the present disclosure, a docking apparatus of an electronic apparatus may include a docking space that is exposed to the outside or in which the docking space may be covered in response to a movement (e.g., rotation) of a support portion that can support the electronic apparatus.

In a further aspect of the present disclosure, an interface terminal of a docking apparatus of an electronic apparatus may be exposed to the outside or may be covered in response to movement of a support portion.

In yet another aspect of the present disclosure a docking apparatus of an electronic apparatus may include an interface terminal that is movable.

In accordance with a still further aspect of the present disclosure, a docking apparatus of an electronic apparatus may include a body that forms an exterior of the docking apparatus. A support portion may be rotatably coupled to the body, and an interface module may be coupled to the body. The interface module may include an interface terminal for connection to the electronic apparatus.

In accordance with yet another aspect of the present disclosure, a docking apparatus of an electronic apparatus may include a body that forms an external housing of the docking apparatus. A support portion may be rotatably coupled to the body, and an interface module may be coupled to the body. The interface module may include an interface terminal for connection to the electronic apparatus. The interface module may also include a driver that moves the interface terminal from the inside to the outside or from the outside to the inside according to a rotation of the support portion.

In accordance with another aspect of the present disclosure, a docking apparatus of an electronic apparatus may include a body that forms an external housing of the docking apparatus. A support portion may be rotatably coupled to the body. An interface module may be coupled to the body and may include an interface terminal for connection to the electronic apparatus. The body may include, a covering portion is formed that enables the interface module not to be exposed at the outside.

In accordance with another aspect of the present disclosure, a docking apparatus of an electronic apparatus may include a body that forms an external housing of the docking apparatus. A support portion may be rotatably coupled to the inside of the body. An interface module may be positioned at a lower end portion of the body and may include an interface terminal for connection to the electronic apparatus, and only a portion of docking space to support the electronic apparatus may be exposed before a rotation of the support portion and the docking space may be exposed to the outside when the support portion rotates. The support portion may include a sound output module that outputs a sound signal. A protruded portion may separate the electronic apparatus and the sound output module by a predetermined distance.

These and other aspects of the present disclosure are more fully described hereinbelow with reference to the accompanying figures.

DETAILED DESCRIPTION

Figure 1A:
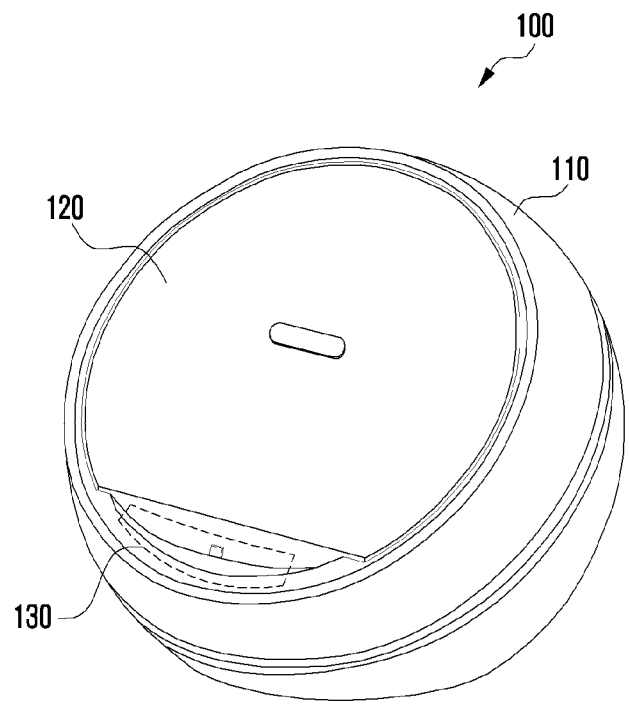
FIG. 1A is a perspective view of a docking apparatus of an electronic apparatus according to an exemplary embodiment of the present disclosure shown in a first state.

Hereinafter, exemplary embodiments of the present disclosure are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the present disclosure.

A docking apparatus according to an exemplary embodiment of the present disclosure supports an electronic apparatus such as a mobile communication terminal, smart phone, Personal Digital Assistant (PDA), tablet Personal Computer (PC), hand-held PC, and Portable Multimedia Player (PMP) and may include at least a sound output module. However, exemplary embodiments of the present disclosure are not limited thereto, and the docking apparatus may further include a charge module, wireless charge module, short range wireless communication (e.g., Bluetooth, WiFi, Zigbee, and infrared rays) module, touch module that can recognize a touch, and proximity sensor module.

Figure 1B:
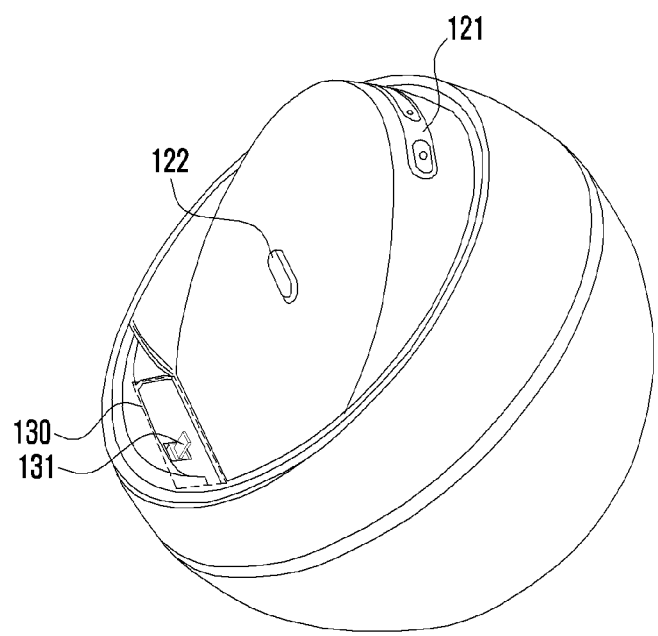
FIG. 1B is a perspective view of the docking apparatus of FIG. 1A shown in a second state.
Figure 1C:
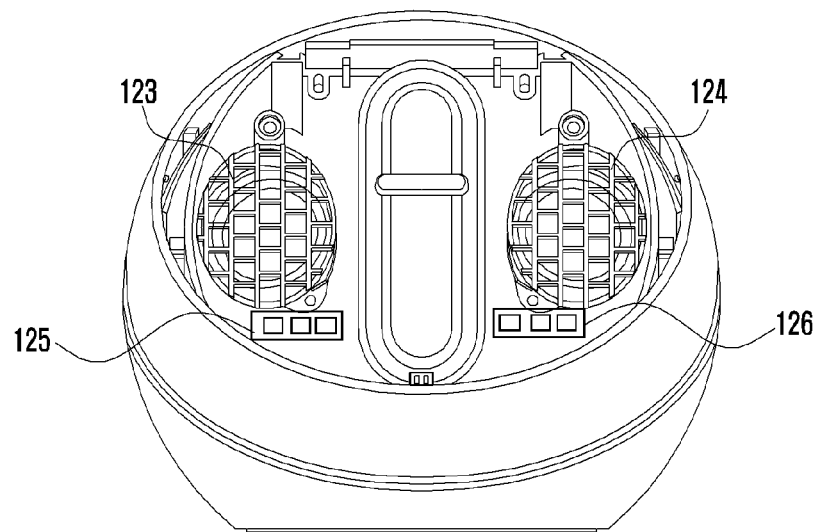
FIG. 1C is a front view of the docking apparatus of FIG. 1A with parts removed.
Figure 1D:
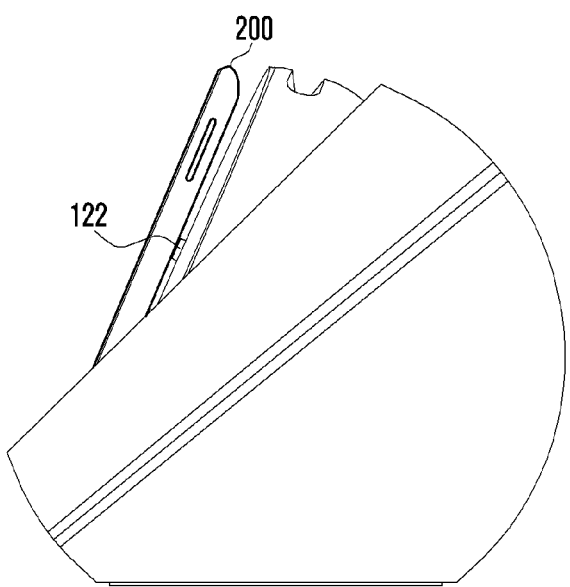
FIG. 1D is a side view of the docking apparatus of FIG. 1A shown operatively coupled to the electronic apparatus.
Figure 1E:
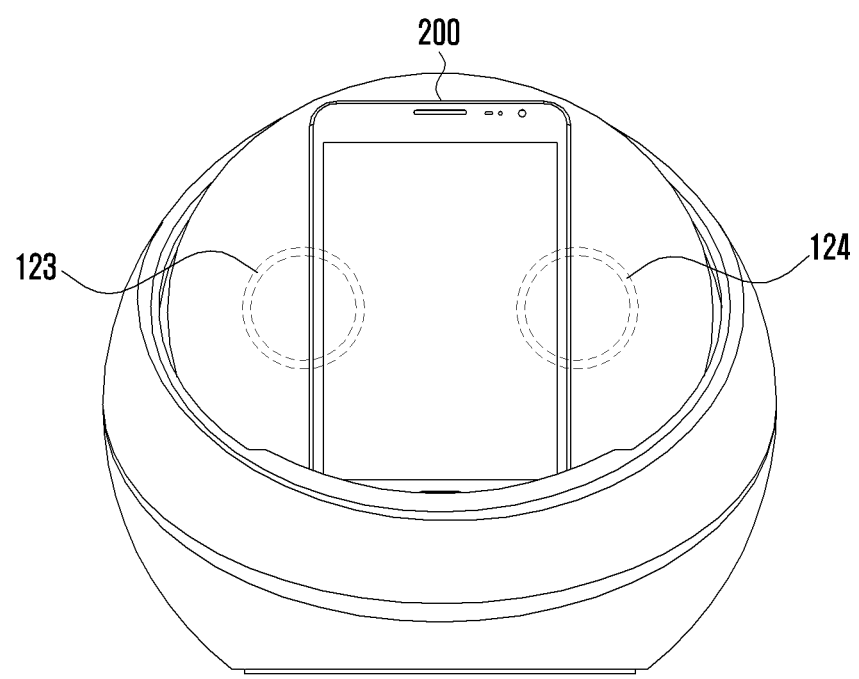
FIG. 1E is a front view of the docking apparatus of FIG. 1A as shown in FIG. 1D operatively coupled to the electronic apparatus.

FIGS. 1A and 1B are perspective views illustrating a docking apparatus of an electronic apparatus according to an exemplary embodiment of the present disclosure shown in first and second states, respectively. FIG. 1C is a front view of the docking apparatus of FIG. 1A shown with parts removed, thereby revealing an internal configuration of the docking apparatus. FIGS. 1D and 1E are a side view and a front view, respectively, illustrating a state in which an electronic apparatus is operatively coupled to the docking apparatus.

Referring to FIGS. 1A to 1E, a docking apparatus 100 according to the present exemplary embodiment supports an electronic apparatus 200 and enables to extend, or more effectively use, a function of the electronic apparatus 200 by operatively coupling the electronic apparatus to one or more devices or components external to the electronic apparatus. The docking apparatus 100 according to the present exemplary embodiment may be formed in a spherical shape. For example, the docking apparatus 100 may have a spherical shape in which one side is cut such that the apparatus defines a circular opening leading to a conical hole, as shown in FIG. 1A. However, the present disclosure is not limited thereto and the docking apparatus 100 may define various shapes (e.g., a rectangular parallelepiped shape, cube, and circular pillar).

The docking apparatus 100 may include a body 110 that forms an exterior surface or housing, a support portion 120 that is positioned at the inside of the body 110 and that is configured to support the electronic apparatus 200, and an interface module 130 coupled to the body 110 and including an interface terminal 131 for connection to the electronic apparatus 200.

The support portion 120 according to the present exemplary embodiment may be rotatably coupled to the body 110. For example, as shown in FIG. 1A, in the docking apparatus 100, the interface terminal 131 is not completely exposed to the outside and may be in a state (hereinafter, a normal state) that cannot support the electronic apparatus 100. When a lower end portion of the support portion 120 is pressed, as shown in FIG. 1B, as the support portion 120 of the docking apparatus 100 rotates relative to the body 110, the interface terminal 131 is completely exposed to the outside to be in a state (hereinafter, a driving state) that can support the electronic apparatus 200. In other words, before the support portion 120 rotates, a portion of docking space to support the electronic apparatus 200 is exposed in a lower end portion of the body 110, and after the support portion 120 is rotated, the docking space may be completely exposed to the outside. The support portion 120 may also be a sound output unit including a sound output module. That is, the sound output unit may perform a support function that supports the electronic apparatus 200 in addition to providing a sound output function.

In this way, the docking apparatus 100 according to the present exemplary embodiment may minimize exposure of the interface terminal 131 in a normal state and expose docking space, as well as the interface terminal, by moving (rotating) the support portion 120, as needed. Therefore, the docking apparatus 100, according to the present exemplary embodiment, can minimize the potential of damaging the interface terminal 131 and ingress or entry of a foreign substance into the interface terminal 131 since the interface terminal may be covered when not operatively coupled to electronic apparatus 200.

The support portion 120 may include a manipulation unit 121 to manipulate the docking apparatus 100 or the electronic apparatus 200. In other words, the manipulation unit 121 may control functions of the electronic apparatus 200. The manipulation unit 121 may include a power supply button and a volume button. The manipulation unit 121 may be formed with a touchscreen, touch key, and physical button key or any combination thereof. The manipulation unit 121 of the docking apparatus 100 according to the present exemplary embodiment may be positioned at an upper surface of the support portion 120, as shown in FIG. 1B. Thereby, the manipulation unit 121 may be exposed to the outside or may be covered from the outside according to movement of the support portion 120. Specifically, when the docking apparatus 100 is in a normal state, the manipulation unit 121 is covered by the body 110, as shown in FIG. 1A, and when the docking apparatus 100 is in a driving state, the manipulation unit 121 is exposed to the outside, as shown in FIG. 1B.

Further, as shown in FIG. 1C, the support portion 120 may include sound output modules 123 and 124 (e.g., a speaker module) therein such that the docking apparatus 100 may provide an external speaker function of the electronic apparatus 200. For example, when the electronic apparatus 200 detects a connection to the docking apparatus 100, the electronic apparatus 200 may activate a music reproduction function and control an audio signal output path to output an audio signal through the sound output modules 123 and 124 of the docking apparatus 200. In an embodiment, the docking apparatus 100 may provide a speaker phone communication function. For example, when the electronic apparatus 200 detects a communication request in a state of being docked (i.e., operatively coupled) to the docking apparatus 100, the electronic apparatus 200 may control output audio communication through the sound output modules 123 and 124 of the docking apparatus 100.

Further, the support portion 120 may include a first status display unit 125 representing a status such as reproduction/stop of music and a second status display unit 126 representing a charge status (charging, charge complete) therein. Alternatively, the support portion 120 may include a display device (not shown) to display an operation status of the docking apparatus 100. The display device may be a touchscreen.

The support portion 120 may include a protruded portion 122 that supports the electronic apparatus 200 at one side. For example, as shown in FIG. 1D, the protruded portion 122 may enable the electronic apparatus 200 to not contact a surface of the support portion 120 and the electronic apparatus 200 to be separated by a predetermined distance (e.g., several centimeters). When the sound output modules 123 and 124 are positioned behind the electronic apparatus 200 (as shown in FIG. 1E), such a separation may prevent deterioration of the sound signal or output is deteriorated via the sound output modules 123 and 124 as might occur if the sound output modules were in close or touching proximity to the electronic apparatus 200. The protruded portion 122 may be made of a rubber material, in order to prevent a case of the electronic apparatus 200 from being damaged (e.g., scratched) and may also minimize vibrations. The protruded portion 122 may be used as an ornament for an improved aesthetic external appearance. For example, at a surface of the protruded portion 122 contacting with the electronic apparatus 200, a logo of a product may be printed or carved.

The interface terminal 131 of the interface module 130 may move by a predetermined angle (e.g., −20° to 20°) in a direction toward the support portion 120 and a direction opposite thereto. Here, a symbol "+" means that the interface terminal portion 10 rotates in a direction towards the support portion 120, and a symbol "−" means that the interface terminal portion 10 rotates in a direction away from the support portion 120. Further, a surface of the interface module 130 contacting with the electronic apparatus 200 may move vertically up or down. This enables the electronic apparatuses 200 having different specifications (e.g., size or thickness, etc.) to share the docking apparatus 100. A detailed description thereof will be described later with reference to FIGS. 3B to 3D.

FIGS. 2A to 2D are perspective views illustrating a body, support portion, and interface module constituting the docking apparatus of FIG. 1A.

Referring to FIGS. 2A to 2D, the docking apparatus 100 according to the present exemplary embodiment may include a body 110, support portion 120, and interface module 130.

Figure 2A:
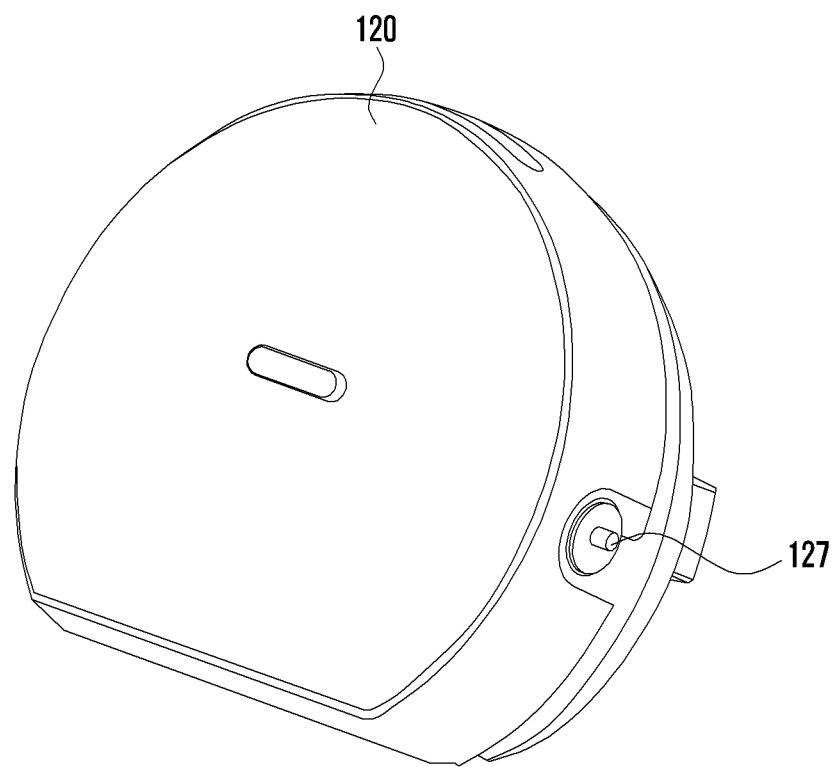
FIG. 2A is a front perspective view of a support portion of the docking apparatus of FIG. 1A.
Figure 2B:
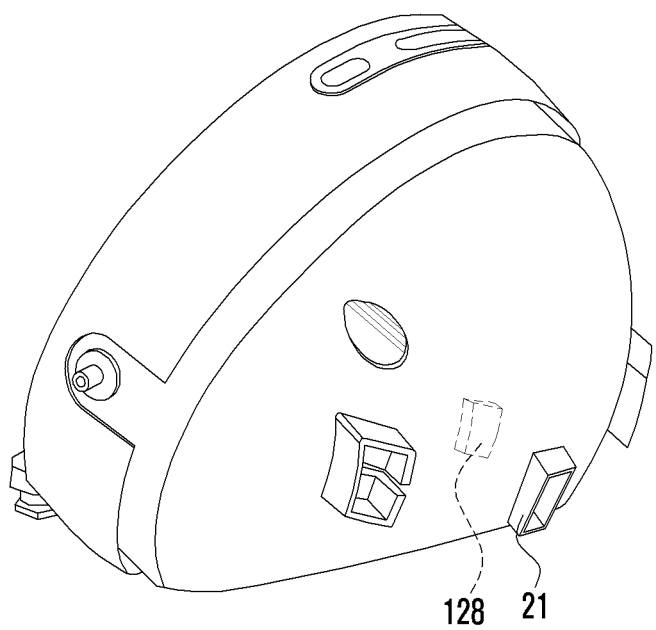
FIG. 2B is a back perspective view of the support portion of FIG. 2A.
Figure 2C:
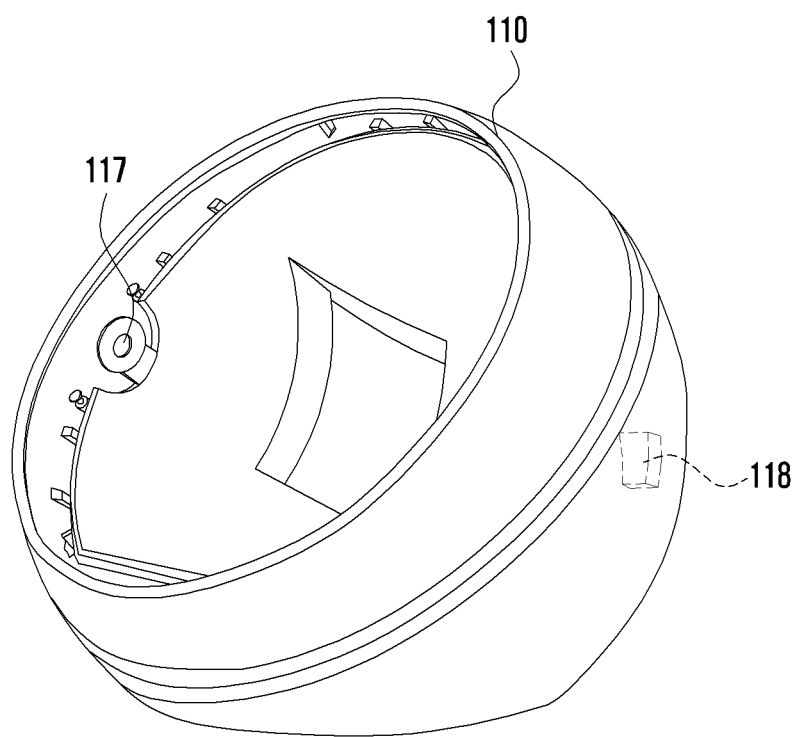
FIG. 2C is a front perspective view of a body portion of the docking apparatus of FIG. 1A.

The support portion 120 is rotatably coupled to the body 110, as described above. For this, the support portion 120 may include a protrusion 127 that performs a function of a rotation shaft at both side surfaces. Further, a rear surface of the support portion 120 may include a fixing means that enables the support portion 120 not to move until a force of a predetermined magnitude or greater is applied. For example, the fixing means may be a first magnetic substance 128 (FIG. 2B). The first magnetic substance 128 may be positioned at the inside of the support portion 120. Similarly, the body 110 may include a second magnetic substance 118, as shown in FIG. 2C. Specifically, the support portion 120 may be releasably secured when in a driving state (i.e., when the interface terminal 131 is exposed) by attraction between the first magnetic substance 128 and the second magnetic substance 118 such that unwanted movement of the support portion is avoided. In contrast, in the normal state, the support portion 120 may be releasably secured in that state due to the repulsion between the first magnetic substance 128 and the second magnetic substance 118. When a force equal to or greater than the attraction force is applied to the support portion 120 or when a force equal to or greater than the repulsion force is applied to the support portion 120, the support portion 120 may be changed from a driving state to a normal state or from a normal state to a driving state. The first magnetic substance 128 and the second magnetic substance 118 may be fixed through an adhesion member such as silicon or a separate fixing device.

A rear surface of the support portion 120 may include an angle limitation portion 21 (FIG. 2B) to limit a rotation angle so that the support portion 120 does not rotate to an angular position that is equal to or greater than a predetermined angle (e.g., 22°). The angle limitation portion 21 may be a structure of a protruded form, as shown in FIG. 2B. That is, when the support portion 120 rotates an angle equal to or greater than a predetermined angle, the angle limitation portion 21 contacts with a latch structure formed in the body 110. Thereby, the support portion 120 may not rotate to an angle that equal to or greater than a predetermined angle.

Referring to FIG. 2C, the body 110 may be formed in a spherical form, one side of the body 110 is cut, and the body 110 may have internal space to mount the support portion 120 and the interface module 130. Both side surfaces of the body 110 may include a rotation shaft groove 117 into which the protrusion 127 of the support portion 120 is inserted. Further, the inside of the body 110 may include the second magnetic substance 118. The body 110 may be include a plurality of parts as will be described later with reference to FIG. 3A.

Figure 2D:
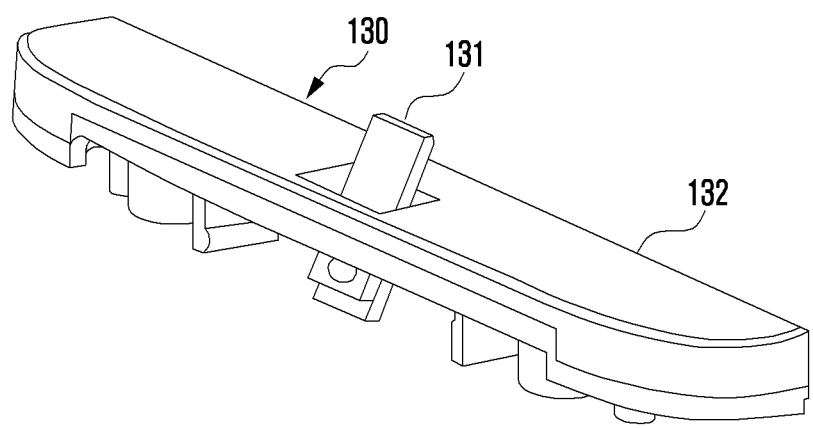
FIG. 2D is a perspective view of an interface module portion of the docking apparatus of FIG. 1A.

Referring to FIG. 2D, the interface module 130 is coupled to the body 110 and may include an interface terminal 131 for connection to the electronic apparatus 200. The interface terminal 131 may be, for example, a Universal Serial Bus (USB) or a micro-USB. However, an exemplary embodiment of the present disclosure is not limited thereto. For example, the interface terminal 131 may be a 10-pole connector or a 20-pole connector. Further, the interface terminal 131 may elastically move by a predetermined angle between a direction facing towards the support portion 120 and a direction facing away from the support portion 120. Further, a support surface 132 positioned at the uppermost side of the interface module 130 may elastically move in a downward direction. A detailed structure of such an interface module 130 will be described later with reference to FIGS. 3B-3D.

In the foregoing exemplary embodiment, it has been described that a movement of the support portion 120 is releasably secured using the first magnetic substance 128 and the second magnetic substance 118, but an exemplary embodiment of the present disclosure is not limited thereto. For example, other exemplary embodiments of the present disclosure may use a magnetic substance included in a sound output module instead of the first magnetic substance 128. That is, in another exemplary embodiment of the present disclosure, the support portion 120 may be releasably secured via attraction or repulsion of the second magnetic substance 118 and a magnetic substance included in a sound output module. In another exemplary embodiment of the present disclosure, a magnetic substance included in the first magnetic substance 128, the second magnetic substance 118, and the sound output module may be fully used.

Figure 3A:
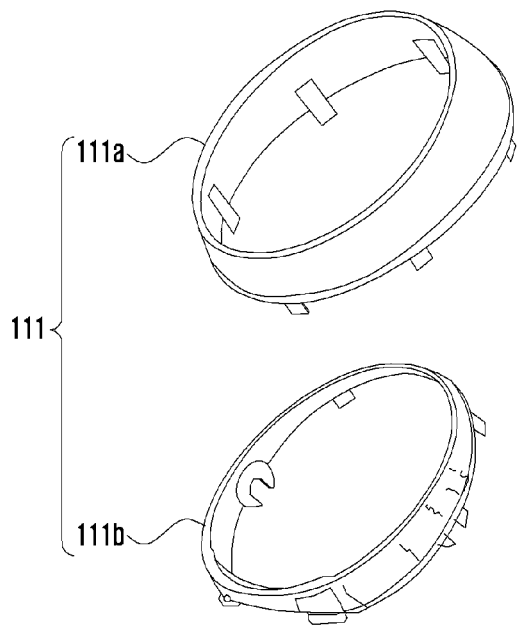
FIG. 3A is an exploded view of the docking apparatus of FIG. 1A.
Figure 3A:
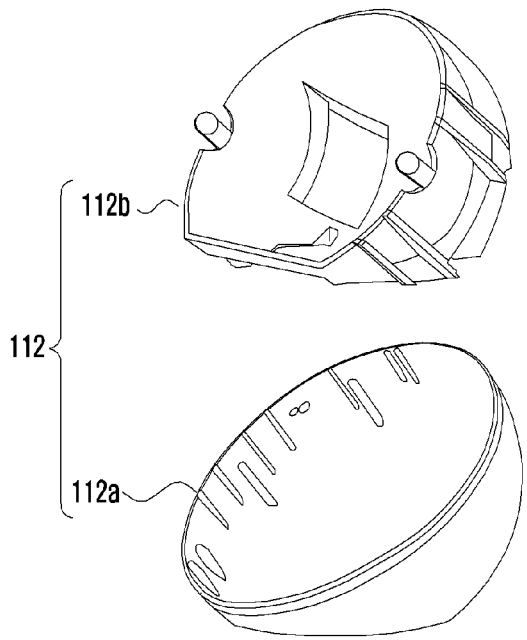
Figure 3A:
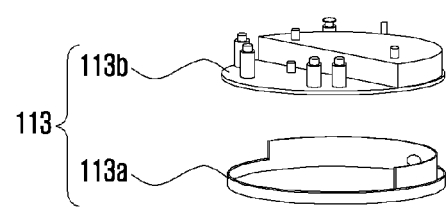

FIG. 3A is an exploded perspective view illustrating a body of the docking apparatus of FIG. 1A.

Referring to FIG. 3A, the body 110 may include a first part 111 that forms a front surface of the body 110, a second part 112 that forms a rear surface of the body 110, and a third part 113 that forms a lower surface of the body 110.

The first part 111 may include a first external part 111*a* that forms an outer side surface of the first part 111 and a first internal part 111*b* coupled to the inside of the first external part 111*a*.

The second part 112 may include a second external part 112*a* that forms an outer side surface of the second part 112 and a second internal case 112*b* coupled to the inside of the second external part 112*a*.

The third part 113 may include a third external part 113*a* that forms an outer side surface of the third part 113 and a third internal part 113*b* coupled to the inside of the third external part 113*a*.

Figure 3B:
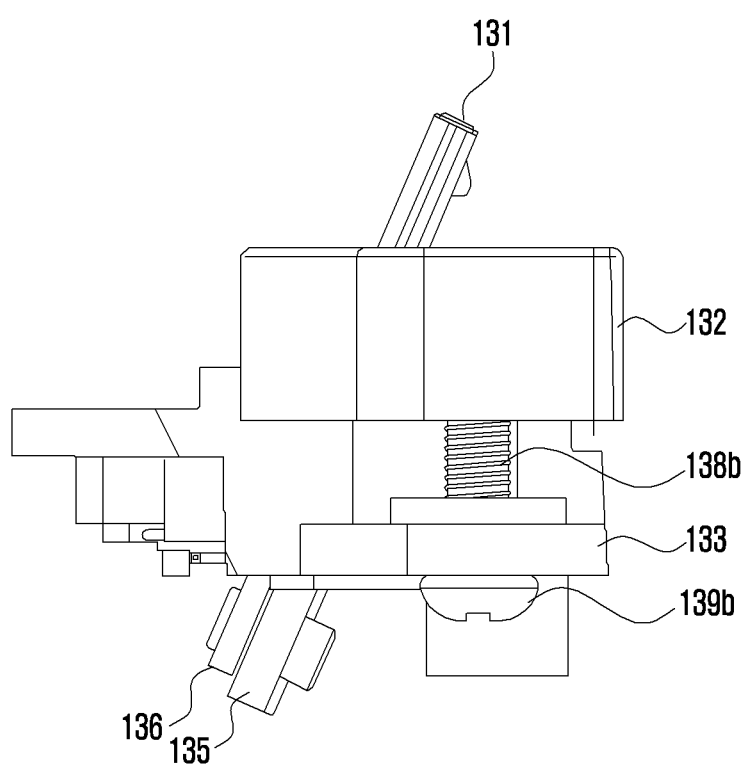
FIG. 3B is a side view of the interface module of FIG. 2D.
Figure 3C:
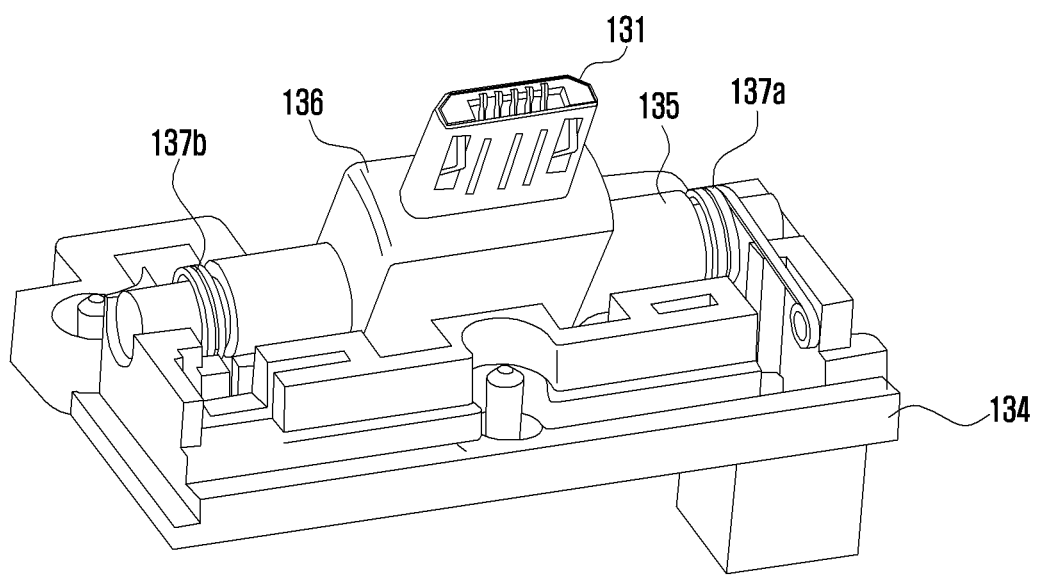
FIG. 3C is a perspective view of the interface module of FIG. 2D with parts removed.
Figure 3D:
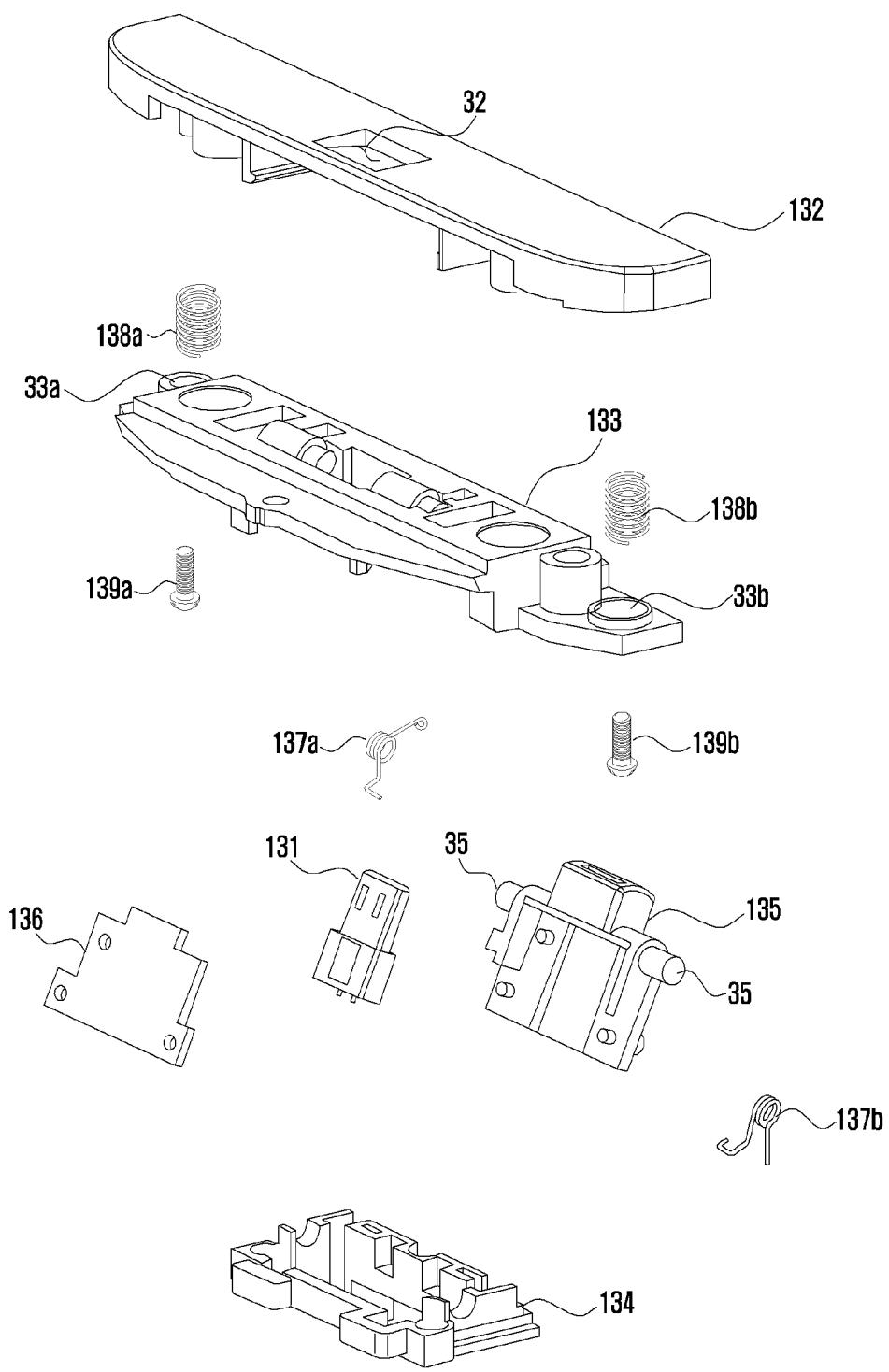
FIG. 3D is an exploded view of the interface module of FIG. 2D.

FIG. 3B is a side view of the interface module of the docking apparatus, FIG. 3C is a perspective view illustrating an interface module of the docking apparatus, and FIG. 3D is an exploded perspective view illustrating an interface module of the docking apparatus.

Referring to FIGS. 3B to 3D, the interface module 130 according to the present exemplary embodiment may include an interface terminal portion 10, fixed body 20 to which the interface terminal portion 10 is rotatably coupled, and moving portion 30 that supports the electronic apparatus 200 and that is movably formed.

The interface terminal portion 10 may include an interface terminal 131, first body 135, second body 136, first elastic member 137*a*, and second elastic member 137*b*.

The interface terminal 131 connects to an interface unit (not shown) of the electronic apparatus 200 and may be positioned and be fixed between the first body 135 and the second body 136. The first body 135 may include a rotation shaft 35. The first elastic member 137*a* and the second elastic member 137*b* are fastened to the rotation shaft 35 to enable the interface terminal portion 10 to elastically move. The first elastic member 137*a* and the second elastic member 137*b* may be a torsion spring. However, an exemplary embodiment of the present disclosure is not limited thereto.

The interface terminal portion 10 stops at a reference position (0°) by an elastic force of the first elastic member 137*a* and the second elastic member 137*b*, and when a pressing force equal to or greater than an elastic force of the first elastic member 137*a* and the second elastic member 137*b* is applied, the interface terminal portion 10 may rotate within a predetermined angle (e.g., −20° to 20°) range about the rotation shaft 35. Here, symbol "+" means that the interface terminal portion 10 rotates in a direction towards the support portion 120, and symbol "−" means that the interface terminal portion 10 rotates in a direction away from the support portion 120.

The fixed body 20 is mounted to enable rotation of the interface terminal portion 10. The fixed body 20 may include an upper part 133 and a lower part 134. The interface terminal portion 10 is positioned between the upper part 133 and the lower part 134. For this, the fixed body 20 may include spaces in which the rotation shaft 35 of the interface terminal portion 10, the first elastic member 137*a* and the second elastic member 137*b* are inserted.

The end portions of the upper part 133 may include a first support portion 33*a* and a second support portion 33*b* that support a third elastic member 138*a* and a fourth elastic member 138*b*, respectively. The first support portion 33*a* and the second support portion 33*b* may include holes that receive a first screw 139*a* and a second screw 139*b*, respectively. In this part, a diameter of the hole may have a diameter greater those that of the first screw 139*a* and the second screw 139*b*. This enables the first screw 139*a* and the second screw 139*b* to freely move.

The moving portion 30 may include a support surface 132, the first screw 139*a*, the second screw 139*b*, the third elastic member 138*a*, and the fourth elastic member 138*b*. The support surface 132 contacts with the electronic apparatus 200 or is adjacent to the electronic apparatus 200 and is movably coupled to the fixed body 20. The support surface 132 may include a hole 32 that receives the interface terminal 131 and a first screw recess (not shown) and a second screw recess (not shown) in which the first screw 139*a* and the second screw 139*b*, respectively, are fastened. The first screw 139*a* and the second screw 139*b* are fastened in the first screw recess (not shown) and the second screw recess (not shown) through holes formed in the first support portion 33*a* and the second support portion 33*b*, respectively, of an upper part 133. In this part, the first screw 139*a* and the second screw 139*b* may be inserted into the third elastic member 138*a* and the fourth elastic member 138*b*, respectively. That is, the support surface 132 is separated by a predetermined distance from the upper part 133 by an elastic force of the third elastic member 138*a* and the fourth elastic member 138*b*, and when an external pressing force equal to or greater than an elastic force of the third elastic member 138*a* and the fourth elastic member 138*b* is applied, the support surface 132 may move in a downward direction (i.e. a direction towards the upper part 133). For this, the third elastic member 138*a* and the fourth elastic member 138*b* may be formed as a compression spring. However, exemplary embodiments of the present disclosure are not limited thereto.

Referring to FIGS. 1 to 3D, each element of the docking apparatus 100 may be made of leather, synthetic leather, wool fabric, synthetic resin (e.g., Carbon Fiber Reinforced Plastics (CFRP), Glass Fiber Reinforced Plastics (GFRP), and PolyCabonate (PC)), glass, sapphire, and metal.

Figure 4A:
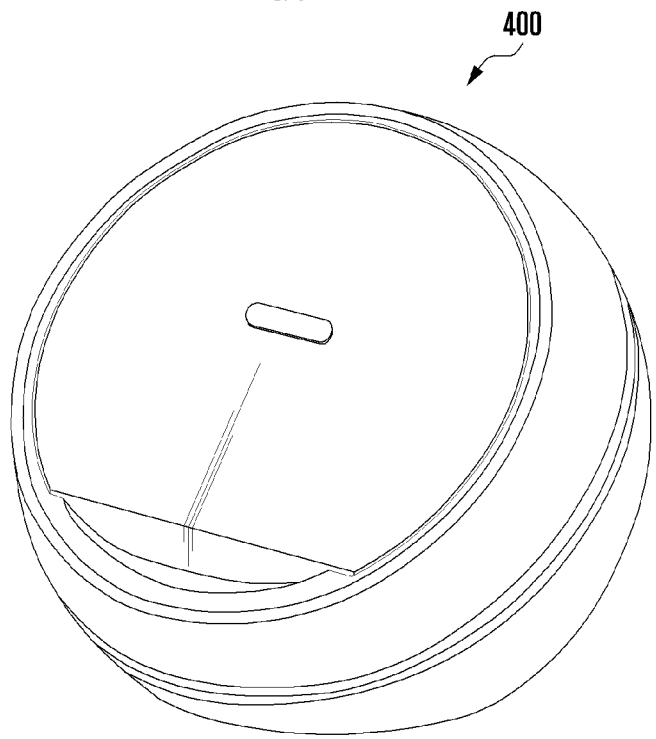
FIG. 4A is a perspective view of a docking apparatus in accordance with another embodiment of the present disclosure shown in a first state.
Figure 4B:
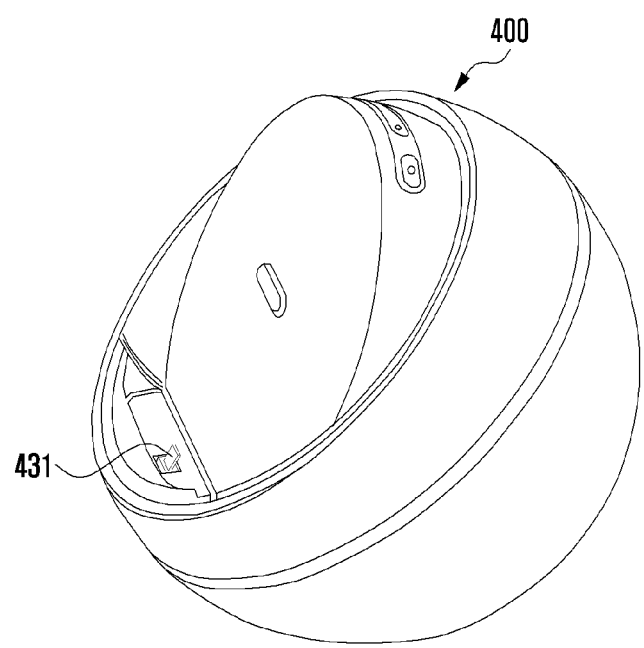
FIG. 4B is a perspective view of the docking apparatus of FIG. 4A shown in a second state.

FIGS. 4A and 4B are perspective views illustrating a docking apparatus according to another exemplary embodiment of the present disclosure shown in first and second states, respectively.

Referring to FIGS. 4A and 4B, a docking apparatus 400 according to the present exemplary embodiment may have a shape similar to the docking apparatus 100 according to an exemplary embodiment of the present disclosure. However, when the docking apparatus 400 according to the present exemplary embodiment is in a normal state that cannot support the electronic apparatus 200, an interface terminal 431 is not exposed to the outside, as shown in FIG. 4A, and when the docking apparatus 400 according to the present exemplary embodiment is in a driving state that can support the electronic apparatus 200, the interface terminal 431 is completely exposed to the outside, as shown in FIG. 4B. For this, the docking apparatus 400 according to the present exemplary embodiment may further include a driver (not shown) that moves the interface terminal 431 from the inside to the outside or from the outside to the inside according to a movement (rotation) of a support portion 420. The driver (not shown) may be formed as a link structure (or device) or as a toothed structure. A detailed description of the driver (not shown) will be described later with reference to FIGS. 5A and 5B. The docking apparatus 400 according to another exemplary embodiment of the present disclosure is similar to the docking apparatus 100 according to an exemplary embodiment of the present disclosure, except for such a difference. Therefore, a detailed description of a configuration of the docking apparatus 400 according to another exemplary embodiment of the present disclosure will be omitted.

Figure 5A:
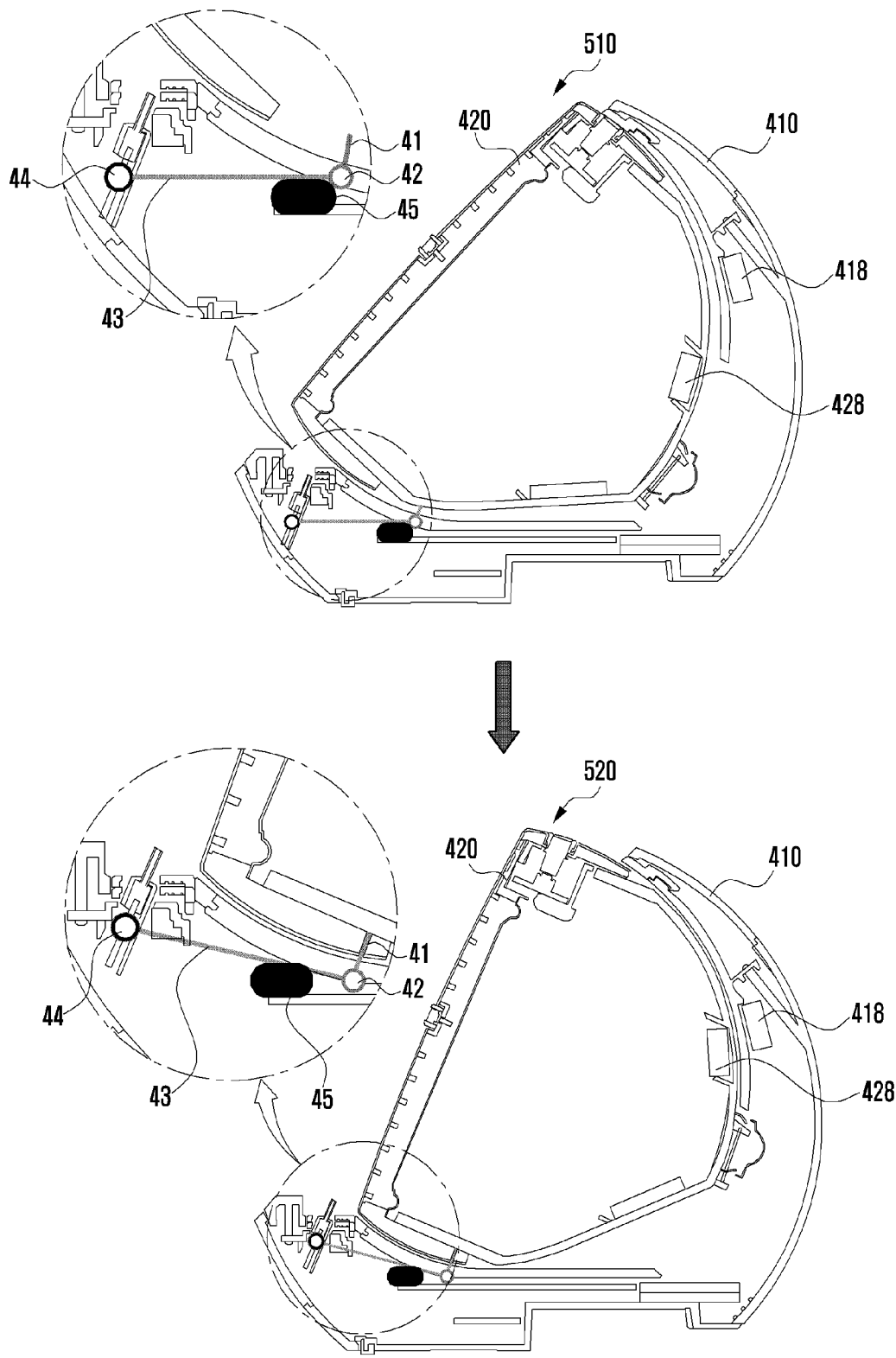
FIG. 5A is a schematic illustration of the docking apparatus of FIG. 4A transitioning from a first state to a second state according to an embodiment of the present disclosure.

FIG. 5A is a schematic illustration of the docking apparatus of FIG. 4A transitioning from a first state to a second state according to an embodiment of the present disclosure. A method of driving an interface terminal using a link structure in the docking apparatus of FIGS. 4A and 4B will be described with reference to FIG. 5A.

Referring to FIG. 5A, the docking apparatus 400 according to another exemplary embodiment of the present disclosure may control whether the interface terminal 431 is to be exposed to the outside or not to be exposed to the outside through a link structure. For this, the docking apparatus 400 may include a first link 41, first shaft 42, second link 43, second shaft 44, and link support portion 45. The first link 41 is fixed to one side of the support portion 420. The first shaft 42 connects the first link 41 and the second link 43. The second link 43 is positioned between the first shaft 42 and the second shaft 44. The second shaft 44 may be connected to one side of the interface terminal 431. The link support portion 45 performs a function of supporting the second link 43 so that the interface terminal 431 smoothly moves.

In the docking apparatus 400 having such a link structure, the interface terminal 431 is not exposed to the outside in a normal state, as shown in the drawing of reference numeral 510. Thereafter, as an external force is applied to a lower end portion of the docking apparatus 400, when the support portion 420 rotates in a first direction, as shown in the drawing of reference numeral 520, the first link 41 and the first shaft 42 rotate also in the first direction. A rotation movement in a first direction of the first link 41 and the first shaft 42 is transferred to the interface terminal 431 through the second link 43 and the second shaft 44 to expose the interface terminal 431 to the outside. In contrast, when a state of the drawing of the reference numeral 520 returns to a normal state (the drawing of reference numeral 510 of FIG. 5A), i.e., when the support portion 420 performs a rotation movement in a second direction, the first link 41 and the first shaft 42 perform also a rotation movement in a second direction. A rotation movement in a second direction of such a first link 41 and first shaft 42 is transferred to the interface terminal 431 through the second link 43 and the second shaft 44 and thus the interface terminal 431 may be moved to the inside not to be exposed to the outside. The docking apparatus 400 according to another exemplary embodiment of the present disclosure is not limited to a part of using a link structure shown in FIG. 5A, and may use various link structures such as, for example, a three-link linkage structure and a five-link linkage structure.

When the support portion 420 is in a normal state, a first magnetic substance 428 and a second magnetic substance 418 are separated by a predetermined distance or greater, as shown in the drawing of the reference numeral 510. In this case, repulsion occurs between the first magnetic substance 428 and the second magnetic substance 418. The support portion 420 may not move in a normal state due to the repulsion. That is, in order to move the support portion 420 to a driving state, an external force equal to or greater than the repulsion force should be applied.

In contrast, when the support portion 420 is in a driving state, the first magnetic substance 428 and the second magnetic substance 418 are adjacent, as shown in the drawing of the reference numeral 520. In this case, attraction occurs between the first magnetic substance 428 and the second magnetic substance 418. The support portion 420 may not move in a driving state due to the attraction. That is, in order to restore the support portion 420 to a normal state, an external force equal to or greater than the attraction force should be applied.

Figure 5B:
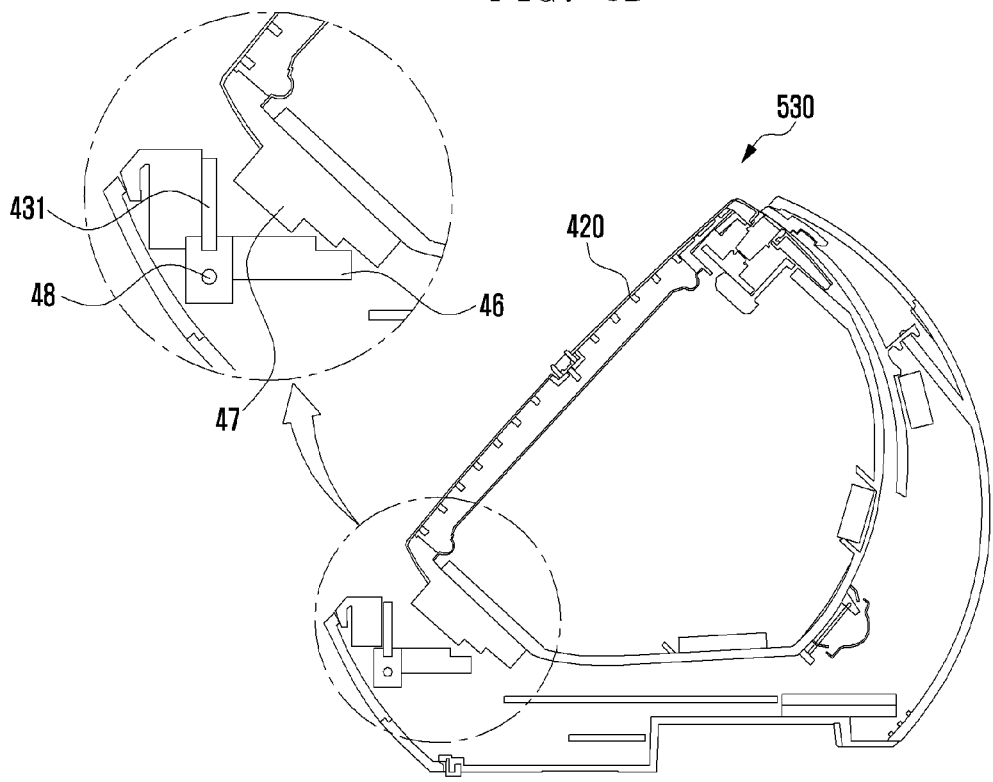
FIG. 5B is a schematic illustration of the docking apparatus of FIG. 4A illustrating transitioning of the docking apparatus from a first state to a second state according to another embodiment of the present disclosure.
Figure 5B:
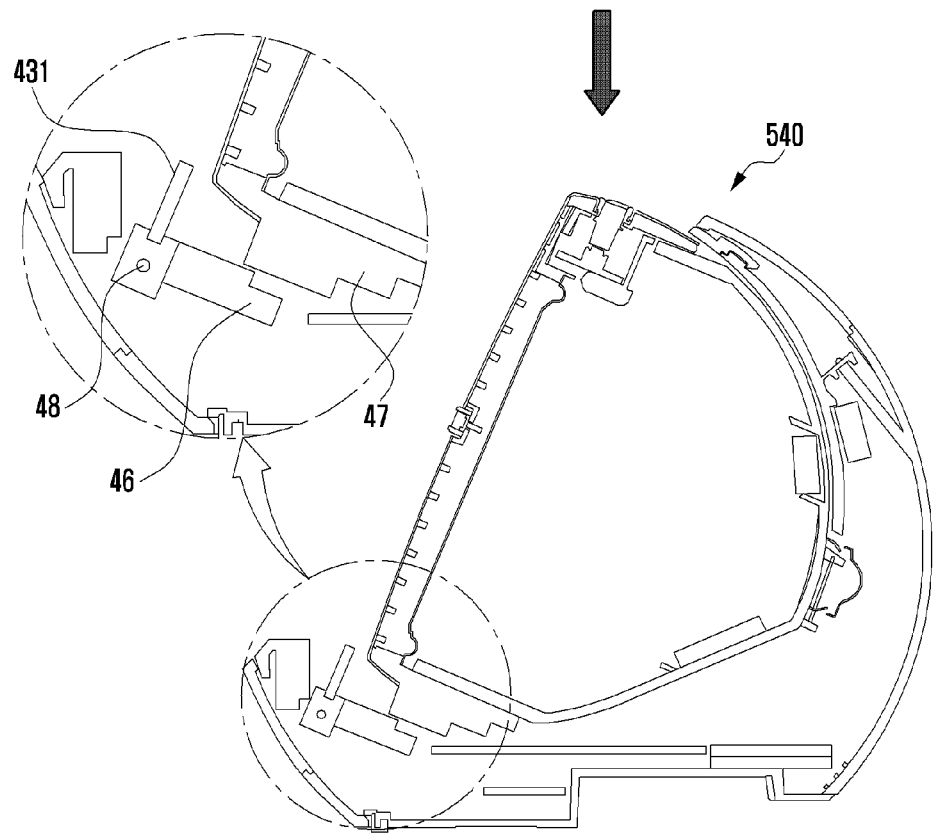

FIG. 5B is a schematic illustration of the docking apparatus of FIG. 4A illustrating transitioning of the docking apparatus from a first state to a second state according to another embodiment of the present disclosure. A method of driving an interface terminal using a toothed structure in the docking apparatus of FIG. 4A will be described with reference to FIG. 5B.

Referring to FIG. 5B, the docking apparatus 400 according to the present exemplary embodiment controls the interface terminal 431 to be exposed to the outside or not to be exposed to the outside through a toothed structure. For this, the docking apparatus 400 may include a first toothed element 46 connected to one side of the interface terminal 431 and a second toothed element 47 connected to one side of the support portion 420. The second toothed element 47 may include a plurality of teeth having different sizes, as shown in FIG. 5B.

When the docking apparatus 400 is in a normal state, the first toothed element 46 may be engaged with a tooth of the second toothed element 47 having a relatively small size, as shown in the drawing of reference numeral 530. However, when the support portion 420 rotates in a first direction, the first toothed element 46 engages with a tooth of the second toothed element 47 having a relatively large size. In this way, the tooth of the second toothed element 47 having a relatively large size engages with the first toothed element 46, and the interface terminal 431 rotates about a rotation shaft 48 to be exposed to the outside, as shown in the drawing of reference numeral 540. In contrast, when the support portion 420 rotates in a second direction in a state of the reference numeral 540, the first toothed element 46 engages with the tooth of the second toothed element 47 having a relatively small size, and the interface terminal 431 is not exposed to the outside. The docking apparatus 400 according to the present exemplary embodiment is not limited to a case of using a toothed structure shown in FIG. 5B and may use various toothed structures.

Figure 6A:
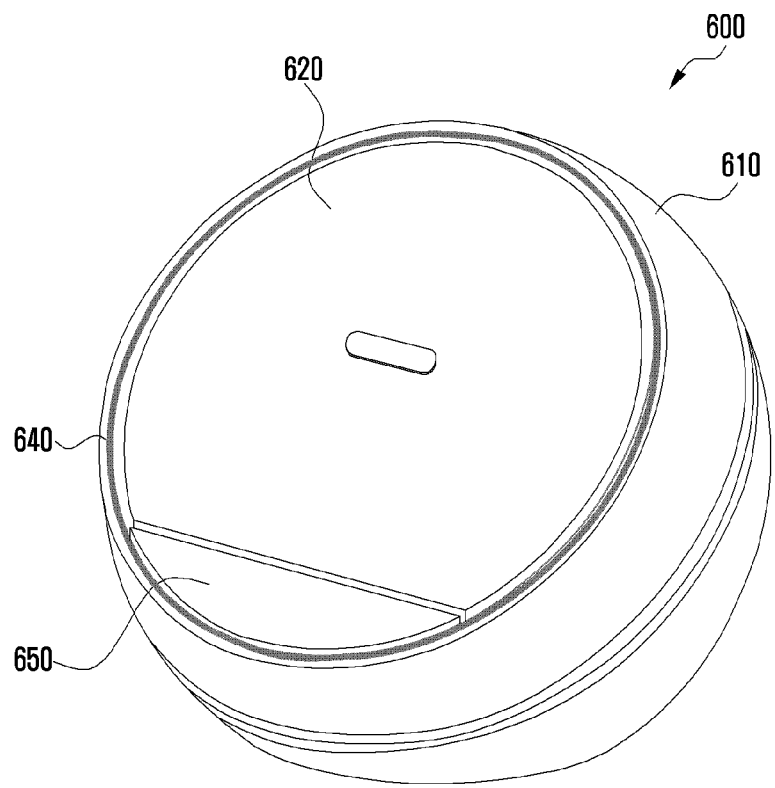
FIG. 6A is a perspective view of a docking apparatus in accordance with another embodiment of the present disclosure shown in a first state.
Figure 6B:
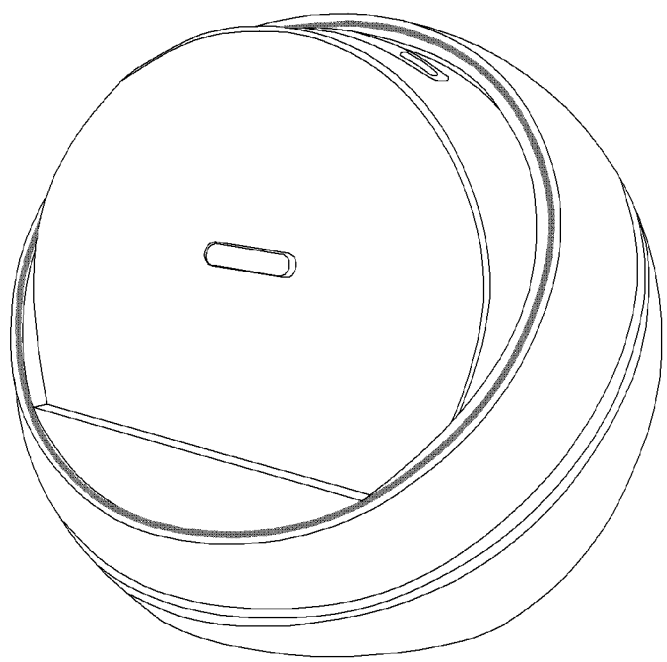
FIG. 6B is a perspective view of the docking apparatus of FIG. 6A.
Figure 6C:
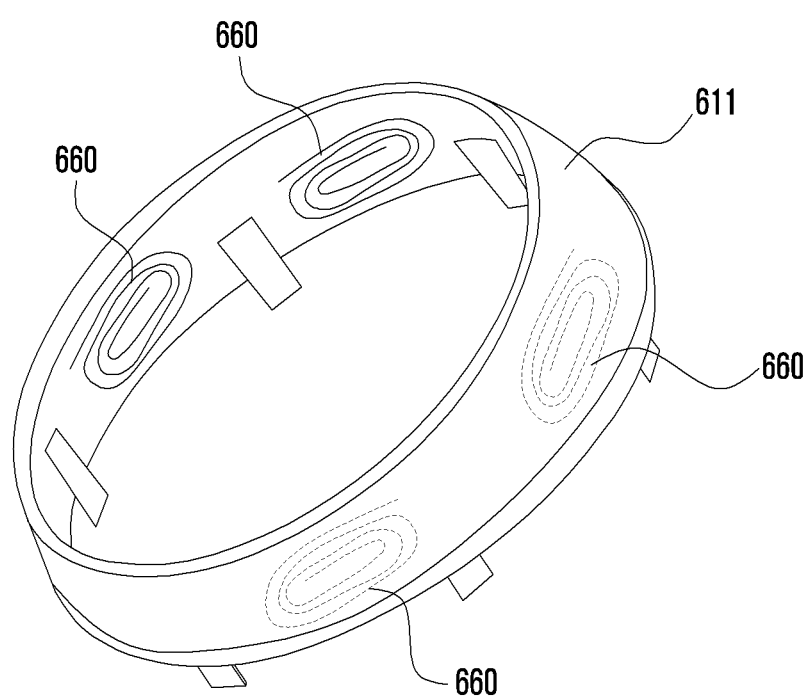
FIG. 6C is a perspective view of an external case in accordance with an embodiment of the present disclosure.

FIGS. 6A to 6C are perspective views illustrating a docking apparatus according to another exemplary embodiment of the present disclosure.

Referring to FIGS. 6A to 6C, unlike the docking apparatus 100 according to an exemplary embodiment of the present disclosure and the docking apparatus 400 according to another exemplary embodiment of the present disclosure, a docking apparatus 600 according to another exemplary embodiment of the present disclosure may be formed to hardly expose internal space. For this, at one side of a body 610 of the docking apparatus 600 according to the present exemplary embodiment, a covering portion 650 may be formed. For example, as shown in FIG. 6A, one edge of the covering portion 650 may contact with one edge of a support portion 620 or may be adjacent to one edge of a support portion 620. Thereby, internal space of the docking apparatus 600 may be hardly exposed to the outside in a normal state. When a lower end portion of the support portion 620 is pressed to be in a driving state, the docking apparatus 600 may expose docking space to support the electronic apparatus 200 to the outside, as shown in FIG. 6B. In this case, the docking apparatus 600 may support the electronic apparatus 200 through the exposed docking space. Here, an interface terminal (not shown) of the docking apparatus 600 according to the present exemplary embodiment may be formed having the same structure as that of the docking apparatus 100 according to an exemplary embodiment of the present disclosure or the docking apparatus 400 according to another exemplary embodiment of the present disclosure The docking apparatus 600 according to the present exemplary embodiment may provide a lighting function. For this, the docking apparatus 600 according to the present exemplary embodiment may further include a light emitting portion 640 that emits light to a circumferential edge of a body 610. The light emitting portion 640 may be formed with a Light Emitting Diode (LED). The light emitting portion 640 may be turned on/off according to a movement of the support portion 620. For example, when the support portion 620 is in a normal state, the light emitting portion 640 may be turned off, and when the support portion 620 is in a driving state, the light emitting portion 640 may be turned on. Alternatively, when the support portion 620 is in a normal state, the light emitting portion 640 may be turned on, and when the support portion 620 is in a driving state, the light emitting portion 640 may be turned off. Alternatively, the docking apparatus 600 according to the present exemplary embodiment may include a separate switch (not shown) for turning on/off the light emitting portion 640.

The docking apparatus 600 according to the present exemplary embodiment may provide a wireless charge function. For this, the docking apparatus 600 according to the present exemplary embodiment may further include a coil 660 that generates a magnetic field for wireless charge at the inside of the body 610. For example, as shown in FIG. 6C, the coil 660 may be mounted at an inner side surface of a first external part 611 of the body 610. However, another exemplary embodiment of the present disclosure is not limited thereto and the coil 660 may be mounted at various positions (e.g., a second external part, an inner side surface of a support portion).

FIG. 6C illustrates that a plurality of coils 660 exist, but an exemplary embodiment of the present disclosure is not limited thereto and the body 610 of the docking apparatus 600 according to the present exemplary embodiment may include at least one coil 660.

The docking apparatus 600 according to the present exemplary embodiment is similar to the docking apparatus 100 according to an exemplary embodiment of the present disclosure or the docking apparatus 400 according to another exemplary embodiment of the present disclosure, except for the above-described difference. Therefore, a detailed description of a configuration of the docking apparatus 600 according to another exemplary embodiment of the present disclosure may be omitted.

In the foregoing description, although not described, a docking apparatus according to an exemplary embodiment of the present disclosure may include a printed circuit board that mounts electronic components to provide a charge function, wireless charge function, short range wireless communication function, touch and proximal touch recognition function, and gesture recognition function. That is, a docking apparatus according to an exemplary embodiment of the present disclosure may include a charge module, wireless charge module, short range wireless communication module (e.g., Bluetooth communication module, Wi-Fi communication module, Zigbee communication module, and infrared ray communication module), touch module that can recognize a touch, and motion sensor module that recognizes a user's gesture. The proximity touch means a state in which a touch input device (e.g., finger, stylus, and a digital pen) approaches a screen within a preset predetermined distance, and the touch means a state in which the touch input device contacts a screen.

Further, a docking apparatus according to an exemplary embodiment of the present disclosure may further include a display device that displays an operation state of the docking apparatus. The display device may be a touchscreen. Thereby, when an electronic apparatus is docked, a docking apparatus according to exemplary embodiments of the present disclosure may display a screen that automatically executes a music reproduction function and that notifies which music is being reproduced in the display device. Further, the docking apparatus may control a light emitting portion to provide a light emitting effect (e.g., flashing) according to music reproduction.

Further, the docking apparatus may use a support portion as a switch that turns on/off power supply of the docking apparatus. For example, the docking apparatus may be formed so that a power supply switch is pressed according to a rotation movement of the support portion.

Alternatively, when the docking apparatus provides a Bluetooth function, if the support portion moves to a driving state, the docking apparatus may automatically transmit a pairing request for Bluetooth communication to the electronic apparatus.

Further, in the foregoing description, a structure in which the support portion manually rotates has been described, but in another exemplary embodiment of the present disclosure, the support portion may automatically rotate by a driving motor. In such a case, movement of a driving motor that drives the support portion may be controlled according to a wireless signal transmitted from the electronic apparatus. Alternatively, the docking apparatus may separately include a switch to operate the driving motor.

Further, in the foregoing description, in exemplary embodiments of the present disclosure, a structure in which a support portion rotates has been generally described, but docking space that can support an electronic apparatus may be secured using another method (e.g., a push button).

As described above, in a docking apparatus of an electronic apparatus according to the present disclosure, a support portion that supports the electronic apparatus can be movably formed. Therefore, in a normal state, external exposure of an interface terminal can be minimized. Thereby, damage of the interface terminal and ingress of a foreign substance into the interface terminal can be prevented.

Further, a pleasing aesthetic external appearance can be preserved by limiting external exposure of an interface terminal of a docking apparatus.

Although exemplary embodiments of the present disclosure have been described in detail hereinabove, it should be clearly understood that many variations and modifications of the basic inventive concepts herein described, which may appear to those skilled in the art, will still fall within the spirit and scope of the exemplary embodiments of the present disclosure as defined in the appended claims.

What is claimed is:

1. A docking apparatus of an electronic apparatus, comprising:
   a body that forms an exterior of the docking apparatus;
   a support portion rotatably coupled to the body; and
   an interface module coupled to the body, the interface module comprising an interface terminal electrically connectable to the electronic apparatus, wherein the interface terminal is elastically rotatable in a first direction towards the support portion and in a second direction away from the support portion.

2. The docking apparatus of claim 1, wherein the body includes a docking space configured to support the electronic apparatus, and wherein a portion of the docking space is exposed at a lower end portion of the body in a first state, and the docking space is completely exposed to the outside in a second state, and wherein transitioning between the first and second states is in response to rotation of the support portion relative to the body.

3. The docking apparatus of claim 1, wherein the interface module comprises a support surface that contacts the electronic apparatus and that supports the electronic apparatus, and wherein the support surface is elastically moveable in a vertical direction.

4. The docking apparatus of claim 1, wherein the support portion comprises a sound output module that outputs a sound signal.

5. The docking apparatus of claim 4, further comprising a protruded portion formed at one side of the support portion so as to separate the electronic apparatus and the sound output module by a predetermined distance when the electronic apparatus is operatively connected to the docking apparatus.

6. The docking apparatus of claim 1, wherein the support portion comprises a first magnetic substance, and the body comprises a second magnetic substance, and
the support portion is releasably fixed at a specific position by attraction or repulsion between the first magnetic substance and the second magnetic substance.

7. The docking apparatus of claim 1, further comprising a manipulation unit configured to manipulate a function of the electronic apparatus when the electronic apparatus is operatively coupled to the docking apparatus.

8. The docking apparatus of claim 7, wherein the manipulation unit comprises at least one of a physical button key, touch key, and touchscreen.

9. The docking apparatus of claim 7, wherein the manipulation unit is positioned at an upper end surface of the support portion and is exposed to the outside in response to a rotation of the support portion relative to the body.

10. The docking apparatus of claim 1, further comprising a light emitting portion formed at a circumferential edge of the body.

11. The docking apparatus of claim 1, further comprising a coil for wireless charge mounted inside of the body.

12. The docking apparatus of claim 1, further comprising a display device that displays an operation state of the docking apparatus.

13. The docking apparatus of claim 1, further comprising a printed circuit board inside of the body, that mounts electronic components to provide at least one of a wireless charge function, charge function, short range wireless communication function, touch and proximity touch recognition function, and gesture recognition function.

14. The docking apparatus of claim 1, wherein the support portion is rotatably coupled to the body to rotate about an axis lateral to the support position.

15. A docking apparatus of an electronic apparatus, comprising:
a body that forms an exterior of the docking apparatus;
a support portion rotatably coupled to the body; and
an interface module coupled to the body, the interface module comprising an interface terminal for connection to the electronic apparatus and a driver that moves the interface terminal from an inside of the body to an outside of the body or from the outside of the body to the inside of the body in response to a rotation of the support portion relative to the body.

16. The docking apparatus of claim 15, wherein the driver includes a link device.

17. The docking apparatus of claim 15, wherein the driver includes a toothed structure.

18. The docking apparatus of claim 15, wherein the interface terminal is elastically rotatable in a first direction towards the support portion and in a second direction away from the support portion, and further comprising a support surface that is configured to support the electronic apparatus and is elastically moveable in a vertical direction.

19. The docking apparatus of claim 15, wherein the support portion comprises:
a sound output module that outputs a sound signal; and
a protruded portion that is configured to separate the electronic apparatus and the sound output module by a predetermined distance when the electronic apparatus is operatively coupled to the docking apparatus.

20. The docking apparatus of claim 19, further comprising a manipulation unit configured to manipulate a function of the electronic apparatus when operatively coupled to the docking apparatus, the manipulation unit being positioned at an upper end surface of the support portion and being exposed to the outside according to a rotation of the support portion.

21. The docking apparatus of claim 15, wherein the support portion comprises a first magnetic substance, and the body comprises a second magnetic substance, and
wherein the support portion is releasably fixed at a specific position by attraction or repulsion between the first magnetic substance and the second magnetic substance.

22. A docking apparatus of an electronic apparatus, comprising:
a body that forms an exterior of the docking apparatus;
a support portion rotatably coupled to the body; and
an interface module coupled to the body and comprising an interface terminal configured to connect the docking apparatus to the electronic apparatus,
wherein the body includes a covering portion that is moveable to selectively expose the interface module to an area outside of the body.

23. A docking apparatus of an electronic apparatus, comprising:
a body that forms an exterior of the docking apparatus, the body including a docking space configured to support the electronic apparatus;
a support portion rotatably coupled to the inside of the body; and
an interface module positioned at a lower end portion of the body and comprising an interface terminal configured to connect the electronic apparatus to the docking apparatus,
wherein only a portion of the docking space is exposed when support portion is positioned in a first position relative to the body and the docking space is exposed to the outside when the support portion is rotated toward a second position relative to the body, and
the support portion comprises:
a sound output module that outputs a sound signal; and
a protruded portion that separates the electronic apparatus and the sound output module by a predetermined distance when the electronic apparatus is connected to the docking apparatus.

* * * * *